July 24, 1956    L. C. FETTERLY    2,756,261
PRODUCTION OF POLYMETHYLBENZENES
Filed June 22, 1954    3 Sheets-Sheet 2
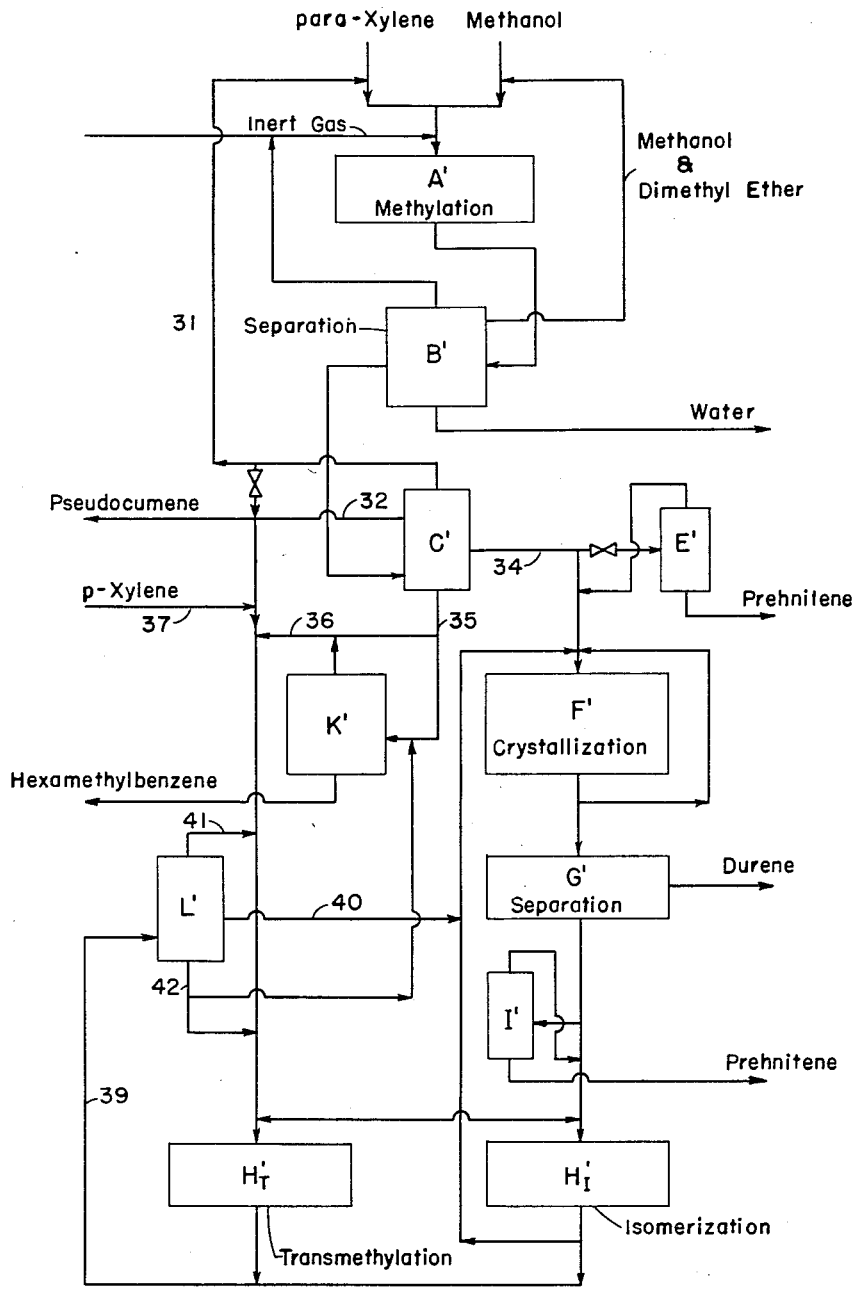
FIG. II
INVENTOR
LLOYD C. FETTERLY
BY John H. Colvin
HIS AGENT July 24, 1956
L. C. FETTERLY
2,756,261
PRODUCTION OF POLYMETHYLBENZENES
Filed June 22, 1954
3 Sheets-Sheet 3
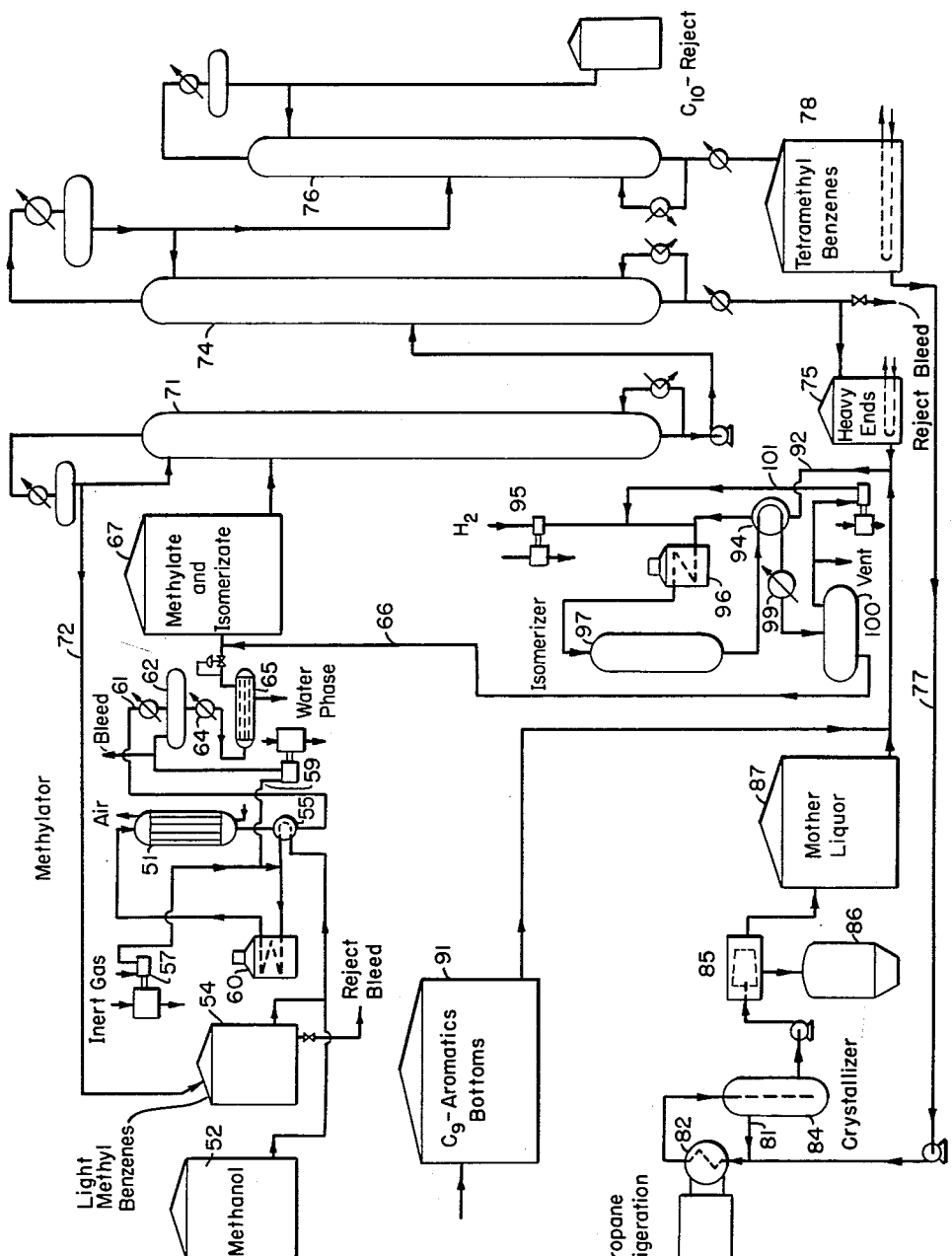
FIG. III
INVENTOR
LLOYD C. FETTERLY
BY John H. Colvin
HIS AGENT United States Patent Office 2,756,261
Patented July 24, 1956

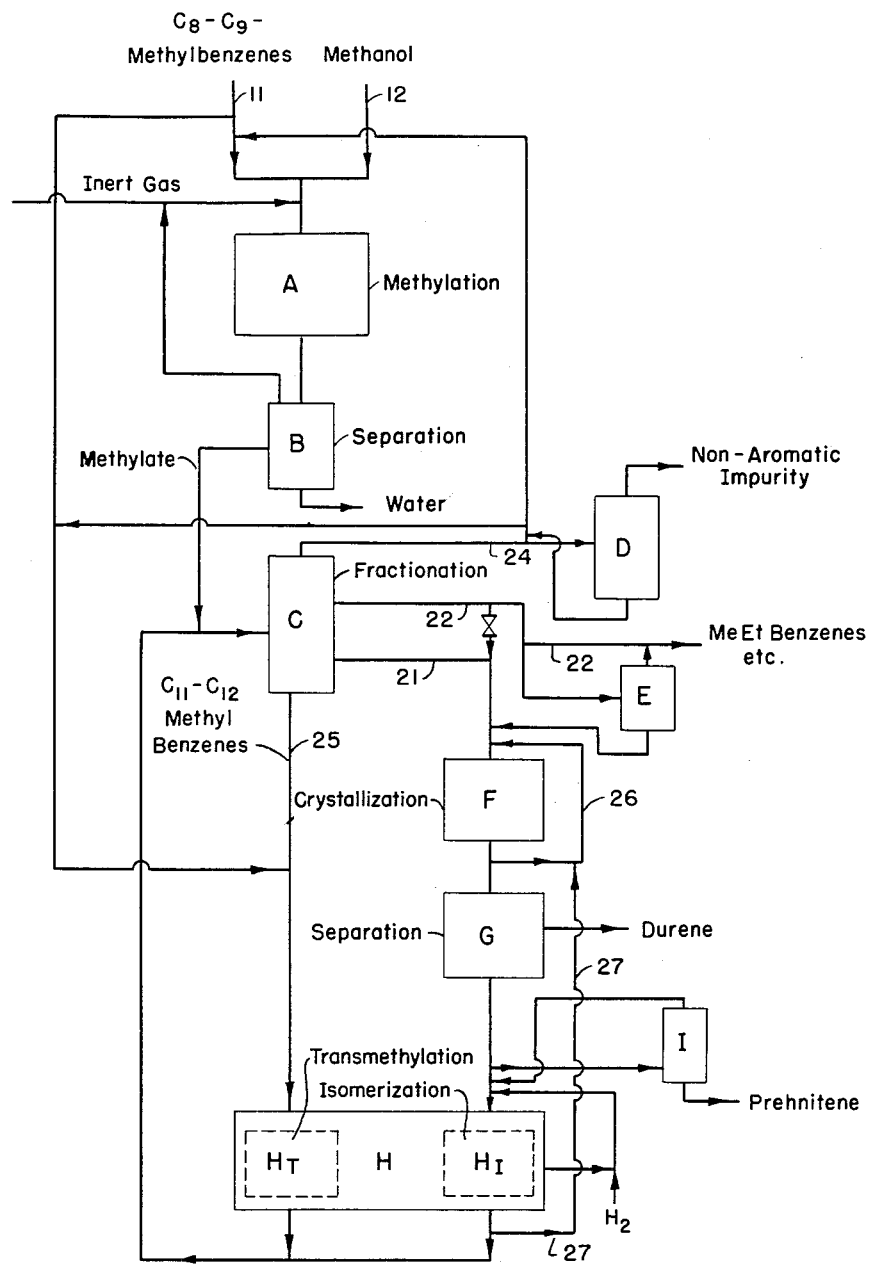
FIG. I

2,756,261

PRODUCTION OF POLYMETHYLBENZENES

Lloyd C. Fetterly, El Cerrito, Calif., assignor to Shell Development Company, New York, N. Y., a corporation of Delaware Application June 22, 1954, Serial No. 438,500

14 Claims. (Cl. 260—668)

This invention relates to the production of polymethylbenzenes which contain at least three methyl radicals such as peseudocumene, prehnitene, durene, and pentamethylbenzene, and more particularly to the production of durene, 1,2,4,5-tetramethylbenzene.

Durene is a well-known alkylated aromatic hydrocarbon, but it has not been readily available in large quantities. It would be expected to be a suitable starting material for the preparation of a wide variety of derivatives thereof, but its shortage and consequent high cost have precluded any commercial-scale development of any processes or products based thereon.

Durene is known to be produced in relatively small proportions during certain petroleum catalytic processes. It has been proposed to recover the durene from this source by crystallization. However, even though durene freezes at about 80° C., it appears to be necessary to chill these petroleum fractions to an extremely low temperature, of the order of $-100°$ C., in order to effect a reasonable recovery of the durene present. Recoveries such as 5% based on the feed certainly leave much to be sought in the production of durene. It would appear, therefore, that an essential requirement is a product source which has a much higher initial concentration of durene.

It is known from Schmerling—U. S. Patent 2,447,599—that aromatic hydrocarbons, such as toluene and the xylenes, are methylated by methanol in vapor phase at an elevated temperature and pressure in contact with an acid of phosphorus as catalyst. However, the ease or rate of methylation increases with an increase in the number of methyl radicals on the aromatic nucleus. Thus, whereas benzene is essentially inert, toluene methylates readily, the xylenes methylate more rapidly, the trimethylbenzenes still more rapidly, etc. Consequently, in the presence of an excess of methanol and with sufficient contact time, the reaction tends to produce a product which is predominantly the highest alkylate, hexamethylbenzene. Efforts to control the reaction to produce suitable proportions of the tetramethylbenzenes, including durene, in the alkylate product have been unsatisfactory, a general mixture of all possible polymethylbenzenes being obtained.

It is an object of the present invention to provide an improved process for the production of durene. A more specific object is to provide an improved process for the production of durene by the methylation of lower methylbenzenes. These objects will be more fully understood and others will become apparent from the description of the invention, which will be made with reference to the accompanying drawing, forming a part of the specification, and wherein:

Fig. I is a schematic representation of the process steps and their combination as used in the practice of the invention;

Fig. II is a schematic representation of the combination of process steps used in a further practice of the invention; and Fig. III is a process flow diagram of an effective plant for carrying out the invention.

It has now been found that durene can be synthesized and recovered in a feasible and efficient manner in a process which comprises the combination of the following steps:

(1) Methylating a methylbenzene containing from one to three methyl radicals, or a mixture of two or more of them, under conditions to produce a mixture of polymethylbenzenes containing durene and higher methylbenzenes; (2) separating therefrom at least a durene fraction distillate and a higher methylbenzenes fraction; (3) recovering durene from the durene fraction; (4) reacting the higher methylbenzenes fraction with a portion of methylbenzenes as used in step (1) in the presence of a catalyst and under conditions to effect transmethylation therebetween to produce further amounts of durene; and (5) cycling the products of step (4) to the fractionation step (2). In accordance with a preferred and more restricted practice of the invention, the remainder of the durene fraction is isomerized by contacting it with a suitable catalyst to isomerize at least a portion of the isodurene and prehnitene to durene and the isomerizate also is cycled to the durene recovery step (3), either directly or via fractionation step (2). The remainder of the durene fraction is relatively rich in prehnitene so that it is a valuable source of that substance. The prehnitene, therefore, in accordance with a still more preferred practice of the invention, is separated from the other components, primarily durene and isodurene, by fractional distillation, and only the isodurene is isomerized to produce further quantities of durene and of prehnitene. The isomerization and the transmethylation operations can be carried out separately in the same equipment, or they can be carried out simultaneously with a suitable acidic catalyst. In addition to the durene fraction and the higher methylbenzenes fraction, the methylation product will usually contain also methylbenzenes having less than four methyl radicals. The lower methylbenzenes thereof, preferably after separation of non-aromatic impurities therein, are recycled to the prior methylation step or all or a part thereof is utilized in the subsequent transmethylation step. When the initial lower methylbenzene starting material is admixed with other similar boiling alkylbenzenes, such as ethylbenzene, the resulting methylalkylbenzenes are separated largely as an intermediate distillate fraction, which can be utilized as a commercial solvent or for other purposes, as in fuels, and the like.

The nature of the methylation product obtained by the vapor phase methylation with methanol, of the lower methylbenzenes, is indicated by the representative data given in Table I. The data in Table I show the distribution of the produced polymethylbenzenes from the vapor phase methylation of ortho-xylene, of para-xylene and of pseudocumene, at a liquid hourly space velocity (of hydrocarbon feed) of 3 over a solid phosphoric acid catalyst, at a temperature of 400° C. and under a pressure of 500 p. s. i. g.

Table 1.—Polymethylbenzene product distribution

| Hydrocarbon Feed | Toluene | ortho-Xylene (95%) | para-Xylene (95%) | | Pseudocumene (70%) |
|---|---|---|---|---|---|
| Mol Ratio, Aromatic/$CH_3OH$ | 3 | 1 | 1 | 1 | 3 | 1 |
| Aromatic Conversion, percent w | 22 | 42 | 37 | 27 | 16 | 34 |
| Distribution of Produced Polymethylbenzenes, mol percent: | | | | | | |
| Dimethylbenzenes— | | | | | | |
| 1, 2 | 33.6 | | | | | |
| 1, 3 | 17.3 | | | | | |
| 1, 4 | 17.1 | | | | | |
| Trimethylbenzene— | | | | | | |
| 1, 2, 3 | | 17.3 | 12.2 | 2.2 | 3.6 | |
| 1, 2, 4 | | 31.1 | 28.1 | 48.5 | 55.5 | |
| 1, 3, 5 | | 3.5 | 2.4 | 2.6 | 5.4 | |
| Tetramethylbenzene— | | | | | | |
| 1, 2, 3, 4 | | 6.9 | 8.3 | 9.1 | | |
| 1, 2, 3, 5 | | 8.1 | 14.5 | 7.8 | 21.0 | 51.3 |
| 1, 2, 4, 5 | | 4.6 | 7.1 | 6.5 | | |
| Penta- and Hexa-methylbenzenes | | 28.5 | 27.4 | 23.1 | 15.6 | 48.7 |

The data in Table 1 give the distribution of the o-, m- and p-xylene in the dimethylbenzenes fraction of the methylation of toluene. The xylenes fraction represented a yield of about 68 mol per cent, based on the toluene consumed. The loss to non-methylbenzenes was negligible, so that there was an essentially 32 mol per cent yield of higher polymethylbenzenes containing from 3 to 6 methyl radicals.

It will also be seen from some of the data in Table 1 that they indicate that a small amount of isomerization was effected. Thus, in the run on the para-xylene at a hydrocarbon to methanol ratio of 3:1, the 5% of non-p-xylene could not account alone for the 9 mol per cent of 1,2,3- and 1,3,5-trimethylbenzenes (a still further amount is assumed to have been methylated still further); p-xylene could give rise to these two trimethylbenzenes only by isomerization either before or after the methylation. The simultaneous isomerization is minimized by operating the methylation under milder conditions for the methylbenzenes, such as by the use of shorter contact times, which can be effected by the use of higher flow rates or higher ratios of methanol to hydrocarbon, or by the use of lower temperatures. Also, a used catalyst, or one with a lower degree of acidity, has a lower isomerization activity.

The data in the fourth column of Table 1 show that pseudocumene, which is the only one of the trimethylbenzenes which can only methylate directly to all three of the tetramethylbenzenes, methylates preferentially to prehnitene, 1,2,3,4-tetramethylbenzene.

The broad aspects of the invention will be better understood from a more detailed description thereof which will be made with particular reference to Fig. I.

An available methylbenzene stream, such as a suitable distillate stream from a refinery hydroforming operation, and usually containing some similarly boiling non-aromatics, shown as a stream of $C_8$–$C_9$-methylbenzenes in line 11, is suitably reacted, in the methylation zone A, with methanol from line 12, such as by a vapor phase methylation over a phosphoric acid catalyst as previously described in the Schmerling patent—U. S. 2,447,599, to give a mixture of various polymethylbenzenes containing from 2 to 6 methyl radicals. The product stream from methylation zone A is separated in zone B to recover the methylate product from inert gas used in pressurizing the methylation zone and the water which is formed in the reaction.

The methylate is then fractionated by distillation in zone C to separate the major portion of the durene in an intermediate $C_9$–$C_{10}$-fraction distillate in line 21, which contains also the durene isomers, isodurene and prehnitene, the relative proportions thereof depending in part on the proportions of the xylene isomers and of the trimethylbenzene isomers in the feed stream. The methylated ethyl- and propylbenzenes which may be present are suitably removed in a further distillate stream which may be removed directly from the system, as by line 22, or further fractionated by distillation, or a modified distillation as extractive or azeotropic distillation as in zone E, to effect a more complete recovery of $C_{10}$-methylbenzenes which are combined with the durene fraction.

The lower boiling methylbenzenes in the alkylate are recovered as an overhead distillate from zone C and recycled for further utility, as via line 24. Non-aromatics therein are suitably removed from the system by separation in zone D, which is suitably a solvent extraction, extractive distillation or an azeotropic distillation operation. The higher boiling substances comprising penta- and hexamethylbenzenes are removed from zone C by line 25.

The durene-containing fraction is readily processed to recover the major portion of the durene by chilling it and crystallizing the durene in zone F and separating the crystals in the separation zone G. Various types of crystallizers can be utilized to effect the crystallization. Since a relatively high concentration of durene in the durene fraction can be obtained, the major portion of the durene is recoverable by the use of relatively mild refrigeration. A portion of the crystal slurry is suitably circulated through the zone as by means of line 26, which provides a suitable means to control crystal growth for high purity and ready separation. The separation in zone G is by means of filters, centrifuges, or the like as will be readily understood.

The $C_{11}$–$C_{12}$-methylbenzenes are reacted with $C_8$–$C_9$-methylbenzenes under alkylation conditions in a transmethylation zone $H_T$ to partially demethylate the higher methylbenzenes while partially methylating the lower methylbenzenes, thereby producing a further amount of tetramethylbenzenes. The transmethylate product is then cycled to the fractionation zone to separate the tetramethylbenzenes from unchanged lower and higher methylbenzenes and each portion combined with its corresponding product from the methylation for further processing.

Although the mother liquor from the crystallization and separation of the durene is a suitable blending component for safety fuels, it is preferred to subject it (either before or after separation of prehnitene therefrom) to an isomerization in zone $H_I$ for the production of further quantities of durene. When the isomerization is carried out under conditions to avoid any appreciable disproportionation, the isomerizate is suitably recycled to crystallization zone F, as by line 27. Otherwise, it is first fractionated, as in zone C, to separate the $C_{10}$ fraction from lower and higher disproportionation products.

As indicated in Fig. I, the transmethylation and the isomerization zones $H_T$ and $H_I$ may be combined into a single zone H. By providing suitable storage tanks, the two operations are readily carried out separately utilizing the same catalyst and either the same conditions, or, preferably, utilizing different conditions which are optimum for the particular operation. On the other hand, both streams of substances can be combined and processed simultaneously under some suitable selected set of conditions.

The methylation can be readily carried out in accordance with the teachings of the Schmerling patent. However, other methods for direct methylation can be used also. Thus, instead of using an acid of phosphorus as the catalyst, the methylation is readily effected under similar conditions of temperature, pressure, contact time, and the like, by the use of various other solid acidic catalysts, such as an acidic silica-alumina catalyst, hydrogen fluoride-treated alumina, sulfuric acid-treated clays, and the like. A temperature of from about 300° C. to about 400° C. can be used. A still lower temperature, such as about 275° C., can be used with the higher methylbenzenes, while a higher temperature such as about 425° C. can be used with the less active lower methylbenzenes, such as toluene.

The transmethylation is generally carried out by contacting the mixture of lower methylbenzenes and higher methylbenzenes with an acidic solid catalyst, such as hydrogen fluoride-treated alumina, acidic silica-alumina catalysts, hydrogen fluoride-treated $SiO_2/Al_2O_3$ catalysts, alumina-boria catalysts, and the like, at a sufficiently effective temperature, such as about 475° C. A temperature as high as about 500° C. or even 510° C. can be used, but undesired degradation increases rapidly above about 500° C., and a temperature as low as about 425° C. is effective although the rate becomes relatively low, a temperature of at least about 450° C. generally being preferred.

The isomerization can be effected by use of the same catalyst as, or of a more acidic catalyst than, the transmethylation catalyst. Generally the isomerization conditions are somewhat similar to those utilized for the transmethylation. However, different conditions can be used with effectiveness. It is often more feasible from the standpoint of simplicity of plant control to carry out both operations simultaneously in the same reactor under conditions which may be intermediate those for optimum operations when carried out separately.

A somewhat more specific application of the invention for the production of durene, while at the same time producing and recovering pseudocumene and prehnitene, is shown by the schematic process diagram in Fig. II, starting with para-xylene as the lower methylbenzene starting material. The various ones of the operation steps which are similar to corresponding steps of Fig. I will not be described again in detail, but it will be understood that they are similar to those of Fig. I.

Referring to Fig. II, para-xylene and methanol are reacted under methylating conditions in the methylation zone A', with the conditions in this case being controlled to yield primarily tri- and tetramethylbenzenes and only a minor proportion of pentamethylbenzene while minimizing the production of hexamethylbenzene, at the same time avoiding isomerization. Besides unreacted p-xylene, the product contains pseudocumene as essentially the only trimethylbenzene, the three isomeric tetramethylbenzenes, pentamethylbenzene and a small amount of hexamethylbenzene.

The methylbenzenes mixture is separated in the separation zone B' from the inert gas, unreacted methanol and methyl ether and the water formed in the reaction. The hydrocarbon mixture is then fractionated by distillation in fractionation zone C'. The unreacted p-xylene is returned by line 31 to the methylation zone A'. The pseudocumene is withdrawn as an intermediate distillate stream in line 32, being essentially the only trimethylbenzene present and having a sufficiently different boiling point (169.3° C.) from p-xylene (138.5° C.) and the lowest boiling point tetramethylbenzene isomer, durene (193–195° C.) to be readily separated therefrom by distillation. The tetramethylbenzene isomers are withdrawn as a higher boiling intermediate distillate fraction in line 34. The remainder, being penta- and hexamethylbenzenes, is withdrawn in line 35.

The tetramethylbenzenes fraction is chilled to crystallize the major portion of the durene, this being accomplished readily by chilling to about −30° C. in crystallization zone F', and the durene crystals separated in G' from the isodurene and prehnitene, which are present in the ratio of about 1:1.1. A substantial portion of the prehnitene is separated as distillation bottoms in distillation zone I' while the remainder of the fraction, as an overhead distillate, is sent to the isomerization zone $H_I'$ or to the transmethylation zone $H_T'$.

The refrigeration requirements for the crystallization of the durene can be materially reduced by concentrating the durene as by distillation in zone E', whereby the durene and isodurene are separated essentially in the overhead stream from prehnitene in the bottoms product. The prehnitene bottoms can be further purified and utilized as such, if desired, or it can be isomerized in isomerization zone $H_I'$ for conversion in part to a further amount of durene.

The penta- and hexamethylbenzenes mixture in line 35 is separated, as by crystallization or distillation, in zone K'. The pentamethylbenzene in line 36 is mixed with a further amount of p-xylene, or a xylene mixture or any one of them, as from line 37, and/or from the overhead stream from zone C', and passed to the transmethylation zone $H_T'$. A portion of the pseudocumene product in line 32 can be utilized as lower methylbenzene for the transmethylation with pentamethylbenzene. It is a preferred practice to operate the prior methylation to produce a large proportion of pseudocumene and a relatively small proportion of pentamethylbenzene, in which case only a portion of the separated pseudocumene is required for transmethylation of the pentamethylbenzene, both products being tetramethylbenzenes. The product stream from the transmethylation, admixed if desired, and preferably so, with the isomerizate from zone $H_I'$, is delivered by line 39 to a fractionation zone L', wherein tetramethylbenzenes are separated as an intermediate boiling distillate from the lower and the higher methylbenzenes. The tetramethylbenzene fraction is recycled in line 40 to the crystallization zone F' for the recovery of additional durene. The lower and higher methylbenzenes fractions are cycled by lines 41 and 42, respectively, in the process.

The separation of the hexamethylbenzene in K' can be by-passed either when the proportion of it is kept low in the streams in lines 35 and 42 or when it is desired to convert it to penta- and tetramethylbenzenes.

Having set forth in schematic form and described the combinations of operations involved in the practice of the invention, a more detailed process scheme will be described with reference to Fig. III, which shows an arrangement of process flows and equipment in a plant for the preparation of durene from a refinery stream of a mixture of dimethylbenzenes and trimethylbenzenes, hereinafter called a $C_9$-aromatics bottoms. For convenience of description and a more ready understanding of the process operations involved, the operations will be grouped into four units: (1) Methylation, (2) distillation, (3) crystallization, and (4) isomerization (including simultaneous transmethylation).

The function of the methylation unit is to methylate the mixed di- and trimethylbenzenes fed to it from the light ends column of the distillation unit. The continuous vapor phase methylation conditions are shown in Table 2.

*Table 2*

Pressure_____ 500 p. s. i. g.
Temperature_____ 660–755° F.
LHSV_____ 2.
Percent conversion:
    Hydrocarbons_____ 60.
    Methanol_____ 95.
Percent yield (based on the hydrocarbons which could be methylated to durene)_____ 96.
Catalyst_____ U. O. P. phosphoric acid.
Mol ratio methanol/HC_____ 1:1.

The reaction is carried out in a tubular reactor 51. The feed methanol and methylbenzenes, taken from storage vessels 52 and 54, is heat-exchanged against reactor effluent in exchanger 55, combined with a suitable inert gas, such as nitrogen, from compressor 57, and with recycle inert gas from line 59 containing methyl ether, is further heated in furnace 60, and passed through catalyst-filled tubes in the reactor 51. The reaction tubes are air-cooled to remove a part of the heat of reaction.

The methylation effluent passes through a feed-product exchanger 55 and a supplementary cooler 61 for condensation. Methyl ether, which is formed in the methylation, is not condensed. The methyl ether and inert gas are separated in separator 62 and recycled, by means of line 59, to the feed stream to the methylators. The condensate in 62 is cooled further in cooler 64 and the water phase is removed in separator 65. The small amount of unreacted methanol is discarded in the water layer. The hydrocarbon layer is mixed with isomerizate (from line 66) from later described operation of the isomerization-transmethylation unit, and stored in storage 67 as feed for the distillation unit.

The function of the distillation unit is to split the hydrocarbons in the methylate and isomerizate/transmethylate products into four cuts by a series of atmospheric pressure distillations. The light ends cut comprising the alkylbenzenes containing up to and including nine carbon atoms, and any similarly boiling non-aromatics included in the feed mixture to the plant (shown later preceding Table 3) are separated as overhead distillate from a suitable distillation column 71, operating at a top temperature of about 150° C. and a bottom temperature of about 200° C. The light ends cut has the approximate composition: 36.4%w non-aromatics, 21.0%w $C_8$-aromatics (dimethylbenzenes), 4.2%w $C_9$-aromatics rejects (other than trimethylbenzenes, namely, methylethyl- and propylbenzenes) and 38.4%w $C_9$-aromatics (trimethylbenzene). As already indicated, this light ends cut is the hydrocarbon feed for the methylation. It is delivered by line 72 to storage 54. The non-aromatic content thereof is readily maintained at a suitable low value by rejecting a minor portion, as from storage 54, as by directing it to gasoline blending or other utility. It will be understood that, if desired, the non-aromatics and aromatics can be readily separated by solvent extraction, or by azeotropic or extractive distillation. The so-called aromatics rejects (alkylbenzenes containing an alkyl group other than methyl) of course are eventually methylated to higher-boiling materials and separated from the system as heavier rejects.

The bottoms product from the light ends fractionator 71 is fractionated in a heavy ends column 74. Here $C_{10}$'s are taken overhead. The heavy ends cut is sent, via storage 75, to the isomerization unit. A small bleed reject stream may be used to minimize build-up and excessive recycling of the heavy ethyl- and propylbenzenes, as desired. In general, since the amount of such material is very small, it is satisfactorily reduced in molecular weight in the transmethylation and disposed of in the $C_{10}$ reject. The feed to the heavy ends column has the approximate composition, by weight: 5.2% $C_{10}$ rejects, 73.9% $C_{10}$'s, 0.6% $C_{11}$ rejects, 9.3% $C_{11}$, 1% $C_{12}$ rejects and 10% $C_{12}$. By operating with a suitable column and with suitable reflux at a top temperature of about 195° C. and a bottom temperature of about 245° C., a good separation between the $C_{10}$ rejects, $C_{10}$'s and $C_{11}$ rejects and the $C_{11}$'s, $C_{12}$ rejects and $C_{12}$'s is obtained. The heavy ends column tops is refractionated in a $C_{10}$'s column 76, to separate a substantial portion (about 25%) of the dimethylethyl- and methylpropylbenzenes ($C_{10}$ rejects) as a rejects concentrate cut (about 80%). The bottoms product, the tetramethylbenzenes cut, is about 90–95% tetramethylbenzenes with a minor proportion of $C_{10}$ rejects and only a trace of $C_{11}$ rejects.

The tetramethylbenzenes cut, which contains about 30 mol per cent durene, is sent by line 77 to the crystallization unit. The feed stream is mixed with crystallizer recycle stream from line 81 and chilled with propane refrigerant in chiller 82, and transferred to crystallizer 84 and maintained at about −20° C. The crystal slurry is separated in centrifuge 85 into a crystal product and a mother liquor. A recovery of about 80% of the durene as a substantially pure durene product is obtained, which is stored in storage hopper 86. The mother liquor, containing about 8%m durene, is stored in 87 for subsequent feed material to the isomerization unit.

The function of the isomerization unit is to isomerize the mother liquor from the crystallization unit and to transmethylate a mixture of the heavy ends cut from the distillation unit (storage 75) with the hydrocarbon raw material feed (from storage 91) for the plant process, the so-called $C_9$-aromatics bottoms.

The $C_9$-aromatics bottoms is a refinery stream from the recovery of xylenes from an aromatics reformate product. It has initial and final boiling points of about 150° C. and about 205° C., respectively. It contains 25–40% xylenes, including 1–3% of similarly boiling non-aromatics, with the remainder having the composition (on a xylene-free basis) as shown in Table 3.

Table 3

| Component: | Percent volume |
|---|---|
| Pseudocumene | 53 |
| Mesitylene | 19 |
| Hemimellitene | 9 |
| Proplybenzene (iso- and n-) | 7 |
| Methylethylbenzenes | 5 |
| $C_{10}$-aromatics | 4 |
| Non-aromatics | 3 |

The three streams from storages 87, 75 and 91 are combined in line 92, heat-exchanged against hot isomerizer effluent in exchanger 94, admixed with pressured hydrogen from compressor 95, heated in heater 96 and the combined stream is subjected to isomerization and transmethylation in isomerizer 97. The conditions for the continuous vapor phase isomerization-transmethylation are shown in Table 4.

Table 4

| | |
|---|---|
| Pressure | 300 p. s. i. g. |
| Temperature | 475° C. |
| LHSV | 1. |
| Conversion of aromatics to $C_{10}$ by transmethylation. | 33%. |
| Catalyst | 1% HF on alumina. |
| Loss | 1% of entering material lost to cracking. |
| Mol $H_2$/mol hydrocarbon | 6:1. |
| Equilibrated composition of $C_{10}$'s effluent. | 54%m isodurene, 34%m durene, 14%m prehnitene. |

The isomerizer effluent is cooled and condensed by means of exchanger 94 and cooler 99. The hydrogen is separated in separator 100 and recycled by line 101. The separated liquid hydrocarbon product is sent via line 66 and storage 67 to the light ends column 71 of the distillation unit, as already described.

It will be understood that many pieces of apparatus and equipment, such as valves, pumps, liquid level and flow control devices, temperature and pressure recording and regulating devices, heaters for reboilers, and the like are provided in the plant as required, but have not been shown in order to simplify the description of the essentials of the process, since their placement and function are well within the skill of the plant designer, constructor and operator. Furthermore, no particular attempt has been made to indicate with any degree of precision the relative dimensions, shapes, placements, etc. of the particular pieces of equipment shown.

The operation of the process described in connection with the plant of Fig. III yields durene at the rate of about 1250 pounds per hour at a feed rate of about 1400 pounds per hour of the $C_9$-bottoms raw material while utilizing methanol at the rate of about 600 pounds per hour. It is to be seen, therefore, that the process thereof is an effec-

I claim as my invention:

1. A process for converting pseudocumene into durene which comprises the combination of steps of: (1) methylating pseudocumene with methanol in vapor phase in contact with an acidic methylating catalyst under conditions to yield a product containing substantial proportions of both tetramethylbenzenes and pentamethylbenzene; (2) separating the product, in admixture with a transmethylate from subsequently described step (3), by distillation to recover (a) an intermediate distillate consisting essentially of the tetramethylbenzenes, (b) a lower boiling distillate containing unreacted pseudocumene and (c) a higher boiling fraction containing the pentamethylbenzene; (3) subjecting the higher boiling fraction (c) in admixture with pseudocumene to vapor phase transmethylation conditions in contact with an acidic catalyst to produce a transmethylate containing a substantial proportion of tetramethylbenzenes; (4) cycling the transmethylate from step (3) to the distillation step (2); (5) separating durene from isodurene and prehnitene in the tetramethylbenzenes distillate (a) by crystallization; and (6) substantially recycling the lower boiling distillate (b) to at least one of said pseudocumene converting steps (1) and (3).

2. A process in accordance with claim 1, wherein the isodurene- and prehnitene-containing mother liquor resulting from the crystallization separation of durene in step (5) is subjected to vapor phase isomerization in contact with an acidic isomerization catalyst whereby a portion of the isodurene and prehnitene is isomerized to durene, and cycling the resulting isomerizate to the crystallization separation step (5).

3. A process in accordance with claim 2, wherein the isomerization of the isodurene- and prehnitene-containing mother liquor is carried out in admixture with the pentamethylbenzene and pseudocumene during the transmethylation thereof in step (3).

4. A process in accordance with claim 1, wherein the isodurene- and prehnitene-containing mother liquor resulting from the crystallization separation of durene in step (5) is distilled to produce an isodurene-enriched distillate and a prehnitene-enriched remainder, and the isodurene-enriched distillate is subjected to vapor phase isomerization in contact with an acidic isomerization catalyst whereby a portion of the isodurene is isomerized to durene and cycling the resulting isomerizate to the crystallization separation step (5).

5. A process in accordance with claim 1, wherein hexamethylbenzene is also formed in the methylation step (1) and wherein the hexamethylbenzene is separated with the pentamethylbenzene in step (2) and subjected to transmethylation in step (3).

6. A process for converting a methyl benzene containing from 1 to 3 methyl groups and containing only methyl substituent radicals into durene which comprises the combination of steps of: (1) methylating said methylbenzene with methanol in vapor phase in contact with an acidic methylating catalyst under conditions to yield a product containing substantial proportions of both tetramethylbenzenes and pentamethylbenzene; (2) separating the product by distillation to recover an intermediate distillate (a) consisting essentially of the tetramethylbenzenes, a lower boiling distillate (b) containing a methylbenzene containing from 1 to 3 methyl groups, and a higher boiling fraction (c) containing the pentamethylbenzene; (3) subjecting the higher boiling fraction (c) in admixture with a methylbenzene containing from 1 to 3 methyl groups and containing only methyl substituent radicals to vapor phase transmethylation conditions in contact with an acidic catalyst to produce a transmethylate containing a substantial proportion of tetramethylbenzenes; (4) separating therefrom by distillation an intermediate distillate consisting essentially of tetramethylbenzenes and a distillate containing a methyl benzene having from 1 to 3 methyl groups and containing only methyl substituent radicals; (5) separating durene by crystallization from an admixture of the tetramethylbenzenes distillates produced in steps (2) and (4), with the separation of a mother liquor enriched in isodurene and prehnitene and (6) substantially recycling said distillates containing methyl benzene having 1 to 3 methyl groups to one of said methyl benzene converting steps (1) and (3).

7. A process in accordance with claim 6, wherein the distillation separation step (4) is made a part of distillation separation step (2) by cycling the transmethylate produced in step (3) to the distillation step (2).

8. A process in accordance with claim 6, wherein the distillation separation step (4) is distinct from distillation separation step (2).

9. A process in accordance with claim 6, wherein the isodurene- and prehnitene-containing mother liquor from step (5) is subjected to vapor phase isomerization in contact with an acidic isomerization catalyst to produce durene from a portion of the isodurene and prehnitene and cycling the resulting isomerizate to the crystallization separation step (5).

10. A process for converting a methyl benzene containing from 1 to 3 methyl groups and containing only methyl substituent radicals into durene which comprises the combination of steps of: (1) methylating said methylbenzene with methanol in vapor phase in contact with an acidic methylating catalyst under conditions to yield a product containing substantial proportions of tetramethylbenzenes and a higher polymethylbenzene; (2) separating the product by distillation to recover an intermediate distillate (a) consisting essentially of a major portion of the tetramethylbenzenes, a lower boiling distillate (b) containing a methylbenzene containing from 1 to 3 methyl groups, and a higher boiling fraction (c) containing the higher polymethylbenzene; (3) separating durene by crystallization from the tetramethylbenzenes distillate (a), with the separation of a mother liquor enriched in isodurene and prehnitene; (4) subjecting at least one of the two fractions, the higher polymethylbenzene fraction (c) and the mother liquor enriched in isodurene and prehnitene, to vapor phase isomerization contact with an acidic isomerization catalyst, when the higher polymethylbenzene is used, it being admixed with a methylbenzene containing from 1 to 3 methyl groups, to produce a product containing a substantial portion of tetramethylbenzenes including durene; (5) cycling the tetramethylbenzenes content thereof to the crystallization separation step (3) for the recovery of the durene content thereof; and (6) substantially recycling said distillates containing methyl benzene having 1 to 3 methyl groups to one of said methyl benzene converting steps (1) and (3).

11. A process for the preparation of durene from para-xylene which comprises the combination of steps of: (1) subjecting paraxylene to vapor phase methylation with methanol in contact with an acidic methylating catalyst under conditions to yield a product containing substantial proportions of pseudocumene, tetramethylbenzenes and a higher polymethylbenzene; (2) separating the product by distillation to recover a first distillate (a) comprising unreacted para-xylene, a second distillate (b) consisting essentially of pseudocumene, a third distillate (c) consisting essentially of tetramethylbenzenes including durene, and a higher boiling fraction (d) containing the higher polymethylbenzene; (3) separating durene by crystallization from the tetramethylbenzenes distillate (c), with the separation of a mother liquor enriched in isodurene and prehnitene; (4) subjecting at least a substantial portion of one of the two fractions, the higher polymethylbenzene fraction (d) and the mother liquor enriched in isodurene and prehnitene, to vapor phase isomerization contact with an acidic isomerization catalyst, when the higher polymethylbenzene is used, it being admixed with a portion of the pseudocumene distillate (b), to produce a product containing a substantial portion of tetramethylbenzenes including durene; and (5) cycling the tetramethylbenzenes content thereof to the crystallization separation step (3) for the recovery of the durene content thereof.

12. A process in accordance with claim 11, wherein the isodurene- and prehnitene-containing mother liquor from step (3) is distilled to produce an isodurene-enriched distillate (e) and a prehnitene-enriched remainder, and the isodurene-enriched distillate (e) is subjected to isomerization in accordance with step (4).

13. A process in accordance with claim 12, wherein at least a portion of the higher polymethylbenzene fraction (d) is also subjected to the isomerization conditions in accordance with step (4).

14. A process for converting a methyl benzene containing 1 to 3 methyl groups and containing only methyl substituent radicals into durene which comprises the combination of steps of: (1) contacting said methyl benzene and methanol in vapor phase with a solid phosphoric acid containing catalyst at a temperature in the range from 275° to 425° C. to yield a product containing substantial proportions of both tetramethylbenzenes and pentamethylbenzene; (2) separating the product by distillation to recover (a) an intermediate distillate consisting essentially of tetramethylbenzenes, (b) a lower boiling distillate containing a methylbenzene containing from 1 to 3 methyl groups and containing only methyl substituent radicals, and (c) a higher boiling fraction containing the pentamethylbenzene; (3) subjecting the higher boiling fraction (c) in admixture with a methylbenzene having from 1 to 3 methyl groups and containing only methyl substituent radicals, in vapor phase, to contact with a solid acidic catalyst under conditions including a temperature in the range from 425° to 510° C. to produce a transmethylate containing a substantial proportion of tetramethylbenzenes; (4) separating from said transmethylate by distillation an intermediate distillate consisting essentially of tetramethylbenzenes and a distillate containing a methylbenzene containing from 1 to 3 methyl groups and containing only methyl substituent radicals; (5) separating durene by crystallization at a temperature from about −20° C. to about −30° C. from an admixture of the tetramethylbenzene distillates produced in steps (2) and (4) containing at least about 30 mol % durene, with a separation of a mother liquor enriched in isodurene and prehnitene; and (6) substantially recycling said methylbenzenes of 1 to 3 methyl groups, recovered in said distillation steps, to at least one of said methylbenzene consuming steps (1) and (3).

References Cited in the file of this patent

UNITED STATES PATENTS

| | | |
|---|---|---|
| 2,335,596 | Marschner | Nov. 30, 1943 |
| 2,418,689 | Benedict | Apr. 8, 1947 |
| 2,443,247 | Howell | June 15, 1947 |
| 2,447,599 | Schmerling | Aug. 24, 1948 |
| 2,532,276 | Birch | Dec. 5, 1950 |
| 2,659,762 | Lien et al. | Nov. 11, 1953 |
| 2,662,926 | Lien et al. | Dec. 15, 1953 |
| 2,665,316 | Bennett | Jan. 5, 1954 |

OTHER REFERENCES

Francis: "Chem. Reviews," vol. 43 (1948), pages 257–269.

Thomas: "Anhydrous Aluminum Chloride in Organic Chemistry" (1941), page 87. Reinhold, New York, publishers.